United States Patent [19]

Muramatsu

[11] Patent Number: 4,823,186
[45] Date of Patent: Apr. 18, 1989

[54] COLOR VIDEO SIGNAL GENERATING DEVICE USING MONOCHROME AND COLOR IMAGE SENSORS HAVING DIFFERENT RESOLUTIONS TO FORM A LUMINANCE SIGNAL

[75] Inventor: Akira Muramatsu, Tokyo, Japan

[73] Assignee: Fuji Photo Film Co., Ltd., Kanagawa, Japan

[21] Appl. No.: 134,748

[22] Filed: Dec. 18, 1987

[30] Foreign Application Priority Data

Dec. 19, 1986 [JP] Japan .................. 61-301688

[51] Int. Cl.[4] .................. H04N 9/09; H04N 9/04
[52] U.S. Cl. .................. 358/43; 358/41
[58] Field of Search .................. 358/41, 43, 44, 48

[56] References Cited

U.S. PATENT DOCUMENTS 4,746,972  5/1988  Takanashi et al. .................. 358/43

FOREIGN PATENT DOCUMENTS

| 0132075 | 1/1985 | European Pat. Off. | 358/43 |
| 54-10626 | 1/1979 | Japan | 358/43 |
| 54-56722 | 5/1979 | Japan | 358/43 |
| 54-116127 | 9/1979 | Japan | 358/43 |
| 1525062 | 9/1978 | United Kingdom | 358/43 |

Primary Examiner—James J. Groody
Assistant Examiner—Randall S. Svihla
Attorney, Agent, or Firm—Birch, Stewart, Kolasch & Birch

[57] ABSTRACT

A video signal generating device with which a video signal of high resolution is produced while significantly suppressing the generation of color Moiré disturbance. The received optical image is split into two beams and applied to respective color and monochrome image sensors. The optical beam applied to the color sensor is optically filtered to limit it in spatial frequency to a band below that applied to the monochrome sensor. A high frequency luminance signal is produced from an output of the monochrome sensor, a low frequency luminance signal is produced from the output of the color sensor, and a composite luminance signal is formed from the combination of the high and low frequency luminance signals. The overall resolution of the device is determined by the monochrome signals produced by the monochrome sensor.

6 Claims, 4 Drawing Sheets

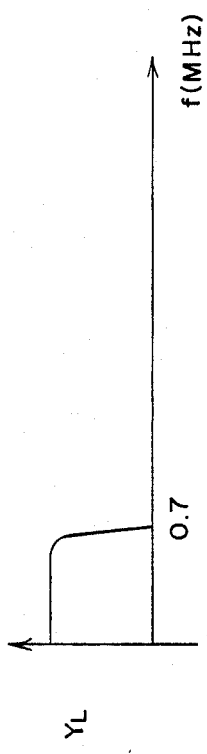
FIG. 2(A)
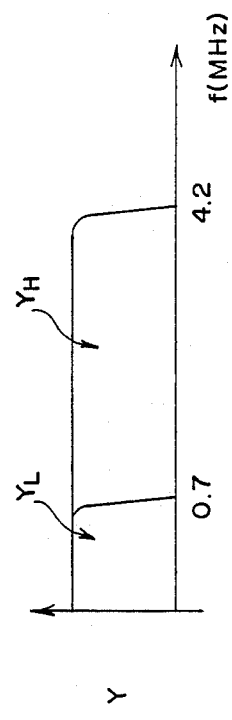
FIG. 2(B)
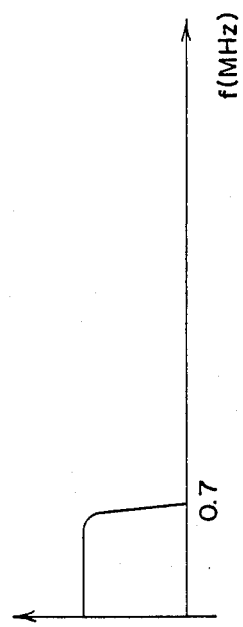
FIG. 2(C)
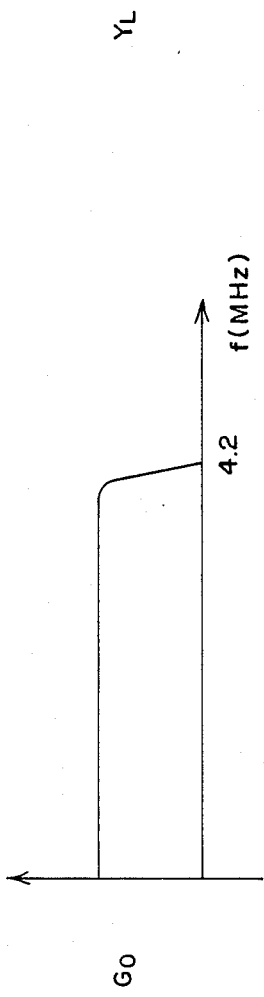
FIG. 2(D)
FIG. 2(E)
FIG. 2(F)
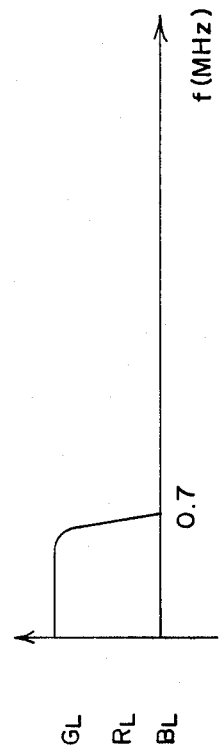
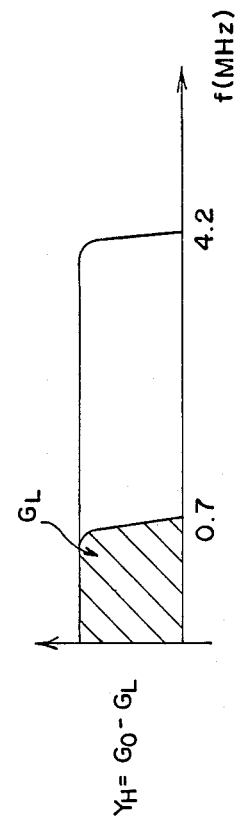

COLOR VIDEO SIGNAL GENERATING DEVICE USING MONOCHROME AND COLOR IMAGE SENSORS HAVING DIFFERENT RESOLUTIONS TO FORM A LUMINANCE SIGNAL

BACKGROUND OF THE INVENTION

The present invention relates to a video signal generating device in which a solid-state color image sensor detects the optical image of an object to provide electrical video signals utilized to form a luminance signal and color difference signals.

In general, a video signal generating device provided in an electronic still camera or color video camera employs a solid-state image sensor having color filters for producing primary or complementary color signals so as to produce luminance signals and color difference signals according to the color video signals outputted by the solid-state image sensor.

FIG. 1 shows the arrangement of a conventional video signal generating device in a double-sensor type color camera or the like. As shown in FIG. 1, a two-color separation dichroic prism 2 is provided behind an image pickup lens 1, the prism 2 being used to separate the incident light beam into green and red-blue beams. An optical image formed by the red and blue light beams is received through an optical low-pass crystal filter 16 on a red-and-blue image sensor 3, on the surface of which is formed a red (R) and blue (B) stripe color filter array, the picture elements of which are horizontally scanned to provide red (R) and blue (B) color video signals. On the other hand, an optical image formed by the green light beam is received through an optical low-pass crystal filter 17 on a green image sensor 4, on the surface of which a green (G) color filter is provided, the picture elements of which are horizontally scanned to provide a green (G) color video signal.

The red, green and blue color video signals are outputted sequentially with a predetermined timing. The green color video signal G is applied through a preamplifier 5 to a low-pass filter 7 having a passband of from 0 to 4.2 MHz, where it is converted into a green signal $G_O$ whose frequency is limited by the passband. The output signal $G_O$ is applied to a subtractor 10 and through another low-pass filter 11. The low-pass filter 11, which has a passband of from 0 to 0.7 MHz, outputs a green signal $G_L$ whose frequency is limited by the passband. The output signal $G_L$ is applied to matrix circuit 14 (described below in detail) and to the subtraction input terminal (−) of the subtractor 10. On the other hand, the red color video signal R, sampled by a sample-and-hold circuit 8, is applied to a low-pass filter 12 having a passband of from 0 to 0.7 MHz, where it is converted into a red signal $R_L$ whose frequency is limited by this passband. Similarly, the blue color video signal B, sampled by a sample-and-hold circuit 9, is applied to a low-pass filter 13 having a passband of from 0 to 0.7 MHz, where it is converted into a blue signal $B_L$ whose frequency is limited by the passband. The red signal $R_L$ and the blue signal $B_L$ are applied to the matrix circuit 14. In the subtractor 10, the green signal $G_O$ and the low frequency green signal $G_L$ are subjected to subtraction, as a result of which a high frequency luminance signal $Y_H$ ($Y_H = G_O - G_L$) having a frequency band of from 0.7 to 4.2 MHz is applied to the matrix circuit 14.

In the matrix circuit 14, a low frequency luminance signal $Y_L$ having a frequency band of from 0 to 0.7 MHz is formed according to the red, blue and green signals $R_L$, $B_L$ and $G_L$ having a frequency band of from 0 to 0.7 MHz, and the low frequency luminance signal $Y_L$ and the high frequency luminance signal $Y_H$ being subjected to addition to form the luminance signal Y. Further in the matrix circuit 14, color difference signals $R_L - Y_L$ and $B_L - Y_L$ are formed according to the red and blue signals $R_L$ and $B_L$ and the low frequency luminance signal $Y_L$. These signals Y, $R_L - Y_L$, and $B_L - Y_L$ are supplied to a color encoder circuit 15, which, in turn, outputs a video signal conforming to NTSC system requirements, for instance.

FIGS. 2A to 2F illustrate frequency characteristics of the signals produced in the above-described signal processing operations. As shown in FIG. 2B, 2D and 2F, respectively, the red, blue and green signals $R_L$, $B_L$ and $G_L$, the low frequency luminance signal $Y_L$ and the color difference signal $R_L - Y_L$ and $B_L - Y_L$ have a frequency band of from 0 to 0.7 MHz. As shown in FIG. 2C, the high frequency luminance signal $Y_H$ has a frequency band of from 0.7 MHz to 4.2 MHz (with the shaded part being omitted). The luminance signal Y, being finally formed through the addition of the high frequency luminance signal $Y_H$ and the low frequency luminance signal $Y_L$, has a frequency band of from 0 MHz to 4.2 MHz, as indicated in FIG. 2E.

A conventional video signal generating device in a single sensor type color camera will be described with reference to FIG. 3. An optical low-pass crystal filter 41 is disposed behind an image pickup lens 21. A color filter 22 having a stripe-shaped or mosaic-shaped red (R), blue (B) and green (G) color filter array is attached to a solid-state image sensor 23. In the sensor 23, electrical signals produced from the picture elements are horizontally scanned. The output of the sensor 23 is supplied to a preamplifier 24, which outputs a color video signal. The color video signal thus outputted is supplied to a color separation circuit 26 to obtain the color signals R, G and B.

The green signal G is applied to a low-pass filter 27 having a passband of from 0 to 4.2 MHz, where it is converted into a green signal $G_O$ whose frequency is limited by the passband. The green signal $G_O$ is supplied directly to one input terminal (+) of a subtraction circuit 31, while it is supplied through another low-pass filter 30 having a passband of from 0 to 0.7 MHz to the other input terminal (−) of the subtraction circuit 31; That is, a green signal $G_L$ is applied to the minus input terminal (−) of the circuit 31. The green signal $G_L$ is further applied to a process circuit 32 where it is subjected to gamma correction, for instance. The output of the process circuit 32 is applied to one input terminal of a luminance signal amplifier circuit 35. On the other hand, the red signal R is supplied to a low-pass filter 28 having a passband of from 0 to 0.7 MHz, where it is converted into a red signal $R_L$ whose frequency is limited by the passband. The red signal $R_L$, after being subjected, for instance, to gamma correction by a process circuit 33, is applied to another input terminal of the luminance signal amplifier circuit 35, and to a modulation circuit 36 for forming a color difference signal. Similarly, the blue signal B is supplied to a low-pass filter 29 having a passband of from 0 to 0.7 MHz, where it is converted to a blue signal $B_L$ whose frequency is limited by the passband. The blue signal $B_L$, after being subjected, for instance, to gamma correction by a process circuit 34, is applied to the remaining input terminal of the luminance signal amplifier circuit 35 and to a modulation circuit 37 for forming a color difference signal.

The luminance signal amplifier circuit 35 forms a low frequency luminance signal $Y_L$ having a frequency band of from 0 to 0.7 MHz according to the red, blue and green signals, $R_L$, $B_L$ and $G_L$, the frequencies of which have been limited by the passband of 0 to 0.7 MHz of the low-pass filters 28, 29 and 30, respectively. The modulation circuit 36 forms a color difference signal $R_L-Y_L$ according to the red signal $R_L$ and the low frequency luminance signal $Y_L$. Similarly, the modulation circuit 37 forms a color difference signal $B_L-Y_L$ according to the blue signal $B_L$ and the low frequency luminance signal $Y_L$. Sub carriers $S_{B1}$ and $S_{B2}$ different in frequency from one another are supplied to the modulation circuits 36 and 37, respectively.

In the subtraction circuit 31, the two input signals $G_O$ and $G_L$ are subjected to subtraction, as a result of which a high frequency luminance signal $G_H$ ($G_H=G_O-G_L$) having a frequency band of from 0.7 to 4.2 MHz is produced. In a mixer 38 the high frequency luminance signal $G_H$ and the low frequency luminance signal $Y_L$ are mixed to produce a luminance signal Y having a frequency band of from 0 to 4.2 MHz. Another mixer 39 mixes the color difference signals $R_L-Y_L$ and $B_L-Y_L$ to provide an output signal. A third mixer 40 mixes the luminance signal Y, the output signal of the mixer 39, and a synchronizing signal $S_C$ to output a video signal conforming to the NTSC system, for instance.

The above-described conventional video signal generating devices are however, disadvantageous in the following points:

In the double-sensor type color device shown in FIG. 1, the subtractor 10 forms the high frequency luminance signal $Y_H$ utilizing only the green signal produced by the green image sensor 4. Assuming that the optical image has substantially no green (G) color video signal, there is a possibility that it may be somewhat difficult to obtain the high frequency luminance signal $Y_H$. As a result, luminance distortion which may be caused by the absence of a green component, is produced between the luminance signal $Y_H$ and the red and blue signals outputted by the red and blue image sensor 3. Furthermore, since the green and red and blue sensors are separately provided, color shift due to picture element shift is liable to occur because it is difficult to manufacture the device with a very high accuracy. In addition, because the image sensors 3 and 4 are covered by color filters, the device generally has a reduced light-detecting sensitivity.

In the single sensor type video signal generating device as shown in FIG. 3, employment of the stripe-type color filter 22 prevents the occurrence of color Moiré; however, the resolution of this device is limited. If another color filter array is employed and the number of picture elements for generating the green signal is made larger than the number of picture elements for the red and blue signals, the resolution is improved, but color Moiré will then occur.

As is apparent from the above description, in the conventional video signal generating device, improving the resolution is not compatible with preventing color Moiré. There thus heretofore been available no technique for solving the two problems at the same time.

SUMMARY OF THE INVENTION

In view of the foregoing, an object of the invention is to provide a video signal generating device having an improved resolution and in which the occurrence of color Moiré is suppressed.

The foregoing and other objects of the invention have been achieved by the provision of a video signal generating device which, according to the invention, comprises: means for dividing the optical image of an object received through an image pickup optical system into first and second optical images; a monochrome image sensor having a first Nyquist spatial frequency band in the horizontal direction and receiving the first optical image; a color image sensor having a color filter array on the surface thereof and having a second Nyquist spatial frequency band in the horizontal direction which is lower than that of the first Nyquist spatial band; optical low-pass means for limiting the second optical image to a spatial frequency band lower than the first Nyquist spatial frequency band prior to reception by the color image sensor; a matrix circuit for forming, in response to color signals outputted by the color images sensor, a low frequency luminance signal and color difference signals whose frequency bands are lower than the second Nyquist spatial frequency band; means for adding the low frequency luminance signal to a part of a high frequency luminance signal outputted by the monochrome image sensor which is higher in frequency band than the spatial frequency band of the low frequency luminance signal to thereby form a luminance signal; and means for forming a video signal from the luminance signal and the color difference signals.

In the device thus constructed, the overall resolution is determined by the first Nyquist spatial frequency band of the monochrome image sensor, and hence the resolution is improved. Furthermore, for instance, red, blue and green color signals produced by the color image sensor can be made to have equal spatial frequency characteristics, and signal components higher in frequency than the second Nyquist spatial frequency band can be removed from the color signals by means of the optical low-pass filtering means, with the result that the occurrence of color Moiré is suppressed.

The color filter array is preferably composed of stripe shaped red, green and blue filters.

In addition, the luminance signal forming means is preferably designed so as to produce a difference signal between the high frequency luminance signal outputted by the monochrome image sensor and a low frequency luminance signal provided by the color image sensor in such a manner that the difference signal is limited to a frequency band equal to the low frequency band, and to add the difference signal thus limited in frequency band to the high frequency luminance signal.

Further, according to the present invention, no two-color separation dichroic prism 2 is required in an optical path, and therefore it is possible to increase sensitivity in obtaining the high frequency luminance signal $Y_H$.

BRIEF DESCRIPTION OF THE DRAWINGS

FIGS. 2A to 2F are characteristic diagrams showing the frequency characteristics of various signals produced in the device of FIG. 1;

DESCRIPTION OF THE PREFERRED EMBODIMENTS

A preferred embodiment of the invention will be described with reference to FIG. 4. First, the overall arrangement will be described.

Figure 4:
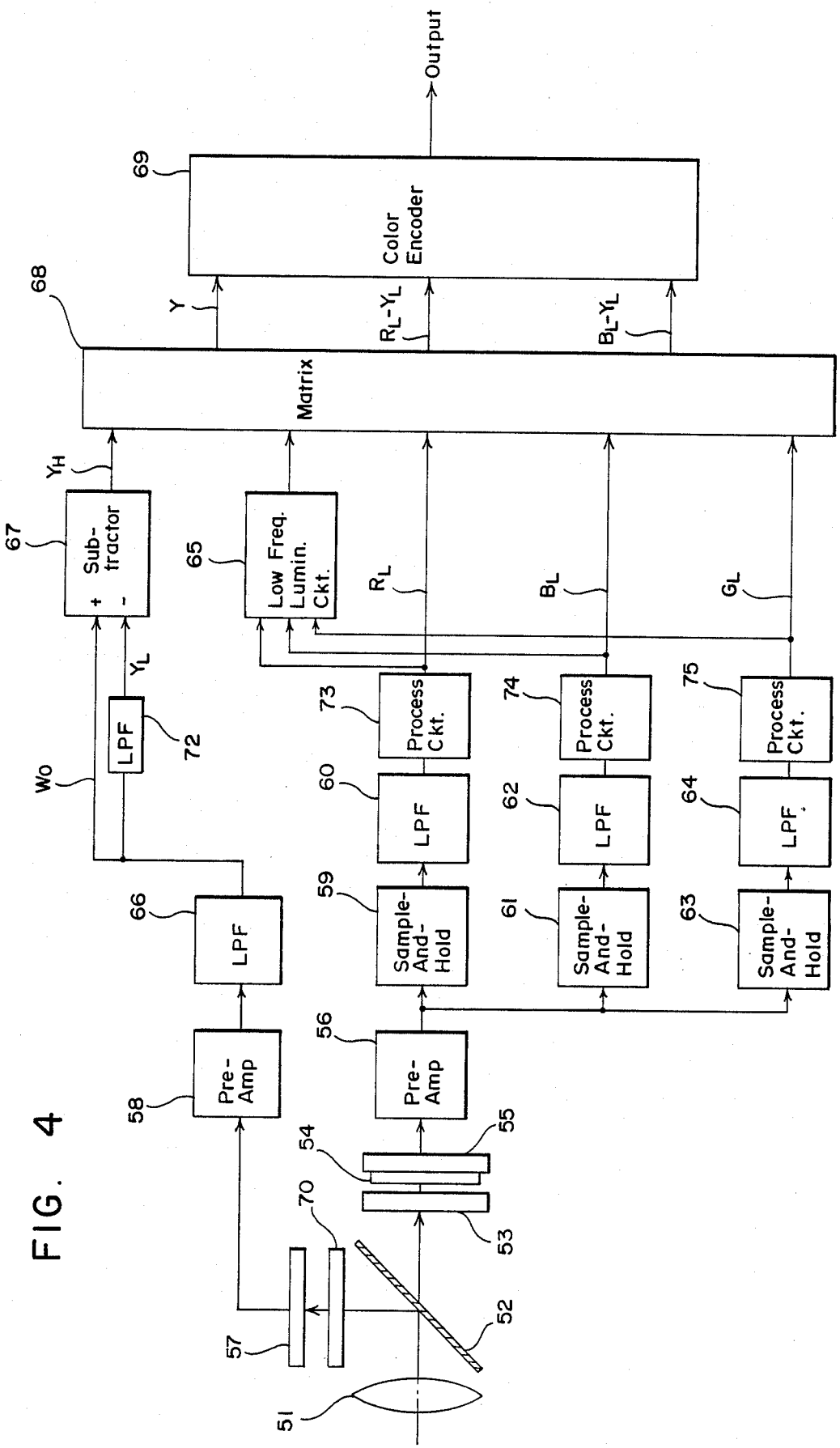
FIG. 4 is a block diagram showing an example of a video signal generating device constructed according to the invention.

In FIG. 4, reference numeral 51 designates an image pickup lens. A half-silvered mirror 52 is disposed behind the lens 51 in the optical path. An optical low-pass crystal filter 53 and a solid state image sensor 55, such as a CCD, on the surface of which a color filter 54 is provided, are disposed behind the half-silvered mirror 52 so that an optical image passed through the half-silvered mirror 52 is formed on the color filter 54. On the other hand, the optical image reflected from the half-silvered mirror 52 is formed on a solid-state image sensor 57, for instance, of the CCD type. In order to limit the frequency band of an incident light, an optical low-pass crystal filter 70 is provided in front of the image sensor 57. The color filter 54 is a stripe-shaped color filter is which stripe-shaped red (R), blue (B) and green (G) color filters are alternately arranged in the horizontal scanning direction at equal intervals. The image sensor 55 (hereinafter referred to as a color image sensor) horizontally scans the picture elements to read out color signals R, G and B in the stated order. The image sensor 57 (hereinafter referred to as monochrome image sensor), having no color filter, outputs a signal the level of which corresponds to luminance instead of hue. The monochrome image sensor 57 thus provides a high frequency luminance signal (as described in more detail below), and accordingly its provision relates directly to the desired improvement in resolution.

With this arrangement, the picture element resolution of the monochrome image sensor 57 is made higher than that of the color image sensor 55. In other words, the Nyquist spatial frequency band for the monochome image sensor 57 is higher than that of the color image sensor 55. Moreover, the optical low-pass filter 53 has a characteristic such that the optical image passed through the half-silvered mirror 52 is limited to a spatial frequency band lower than the Nyquist spatial frequency band of the image impressed on sensor 57. Accordingly, the color image sensor 55 produces no unwanted high frequency signal which can spread to the frequency band of the high frequency luminance signal, and hence the occurrence of luminance distortion is suppressed.

The output color signals R, G and B of the color image sensor 55 are applied through a preamplifier 56 to sample-and-hold circuits 59, 61 and 63, respectfully, in synchronization with the read timing in the horizontal scanning operation.

Figure 1:
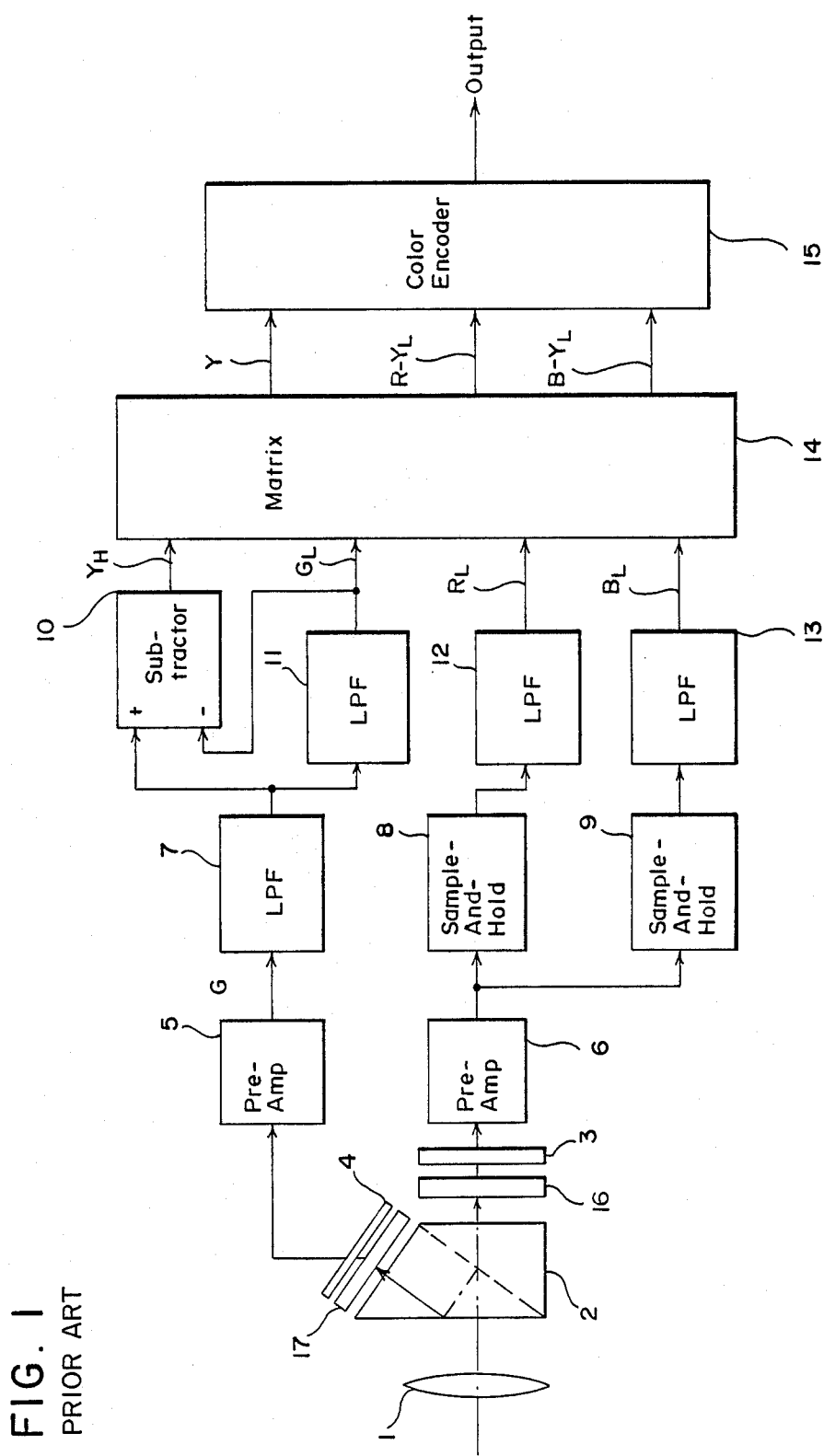
FIG. 1 is a block diagram showing a conventional video signal generating device.
Figure 3:
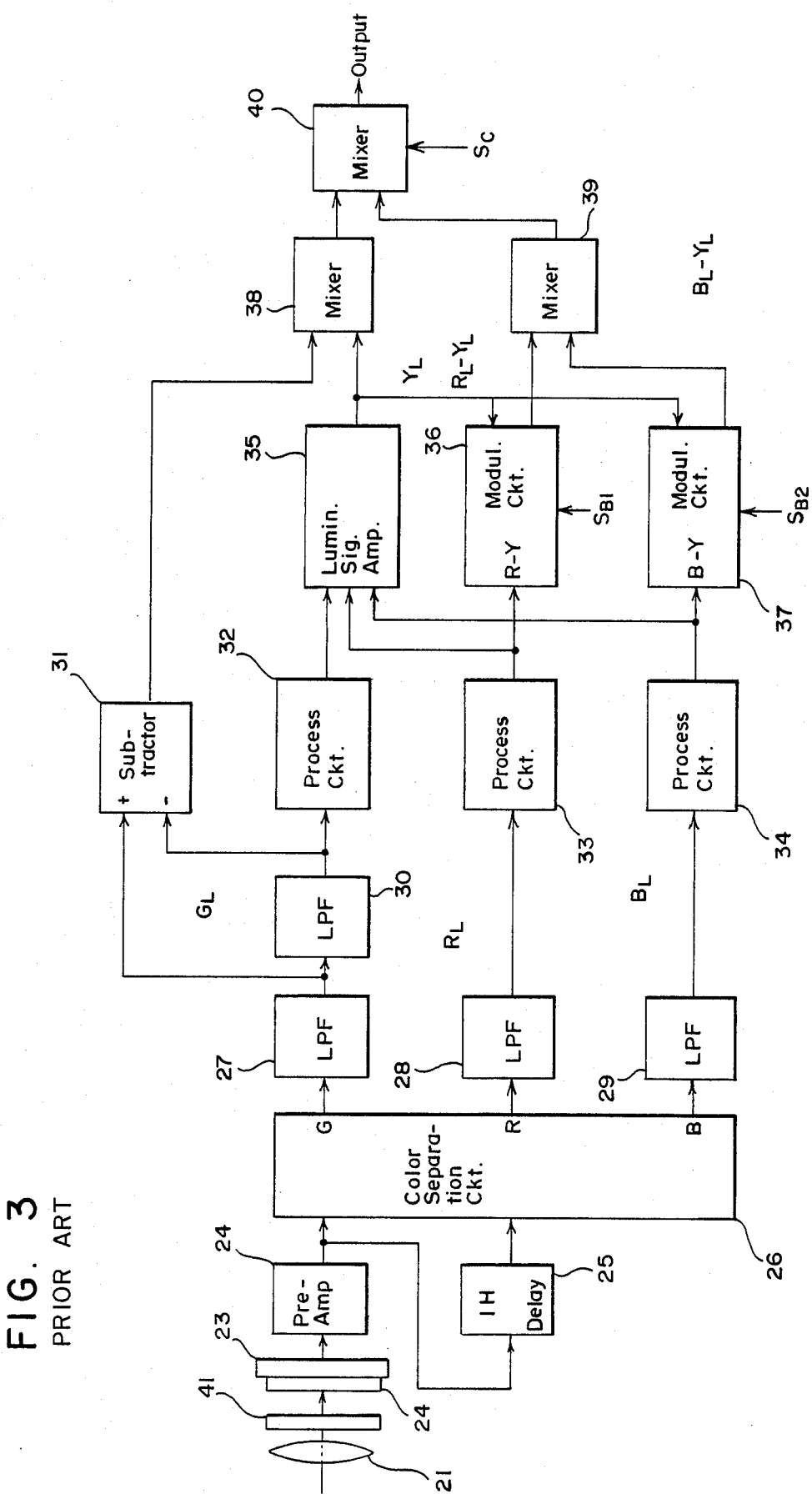
FIG. 3 is a block diagram showing another example of a conventional video signal generating device.

The output color signals R, G and B, sampled by the sample-and-hold circuits 59, 61 and 63, are applied to low-pass filters 60, 62 and 64 having a passband of from 0 to 0.7 MHz, where they are converted into respective color signals $R_L$, $B_L$ and $G_L$, the frequency band of which are limited by the passbands of the filters 60, 62 and 64. The output color signals $R_L$, $B_L$ and $G_L$ from the low-pass filters 60, 62 and 64 are applied through process circuits 73, 74 and 75 to a low frequency luminance signal forming circuit 65 and a matrix circuit 68, respectively. The process circuits 73, 74 and 75 are the same as those 32, 33 and 34 shown in FIG. 3.

The low frequency luminance signal forming circuit 65 mixes the colors signals $R_L$, $B_L$ and $G_L$ in the ratio determined by the following expression to form a low frequency luminance signal $Y_L$:

$$Y_L = 0.30 R_L + 0.59 G_L + 0.11 B_L$$

The luminance signal $Y_L$ is applied to one input terminal of the matrix circuit 68.

On the other hand, the signal W outputted by the monochrome image sensor 57 is applied through a preamplifier 58 to a low-pass filter 66 having a passband of from 0 to 4.2 MHz, where it is converted into a signal $W_O$ whose frequency is limited by the passband. The signal $W_O$ is applied to an input terminal (+) of the subtraction circuit 67. Further, the signal $W_O$ of the low-pass filter 66 is supplied through another low-pass filter 72 having a passband of from 0 to 0.7 MHz to the other input terminal (−) of the subtraction circuit 67.

The subtraction circuit 67 subtracts the low frequency luminance signal $Y_L$ from the signal $W_O$ to form a high frequency luminance signal $Y_H$ ($= W_O - Y_L$) having a frequency band of from 0.7 to 4.2 MHz. The high frequency luminance signal $Y_H$ thus formed is applied to the matrix circuit 68. In this case, the output of the low frequency luminance signal forming circuit 65 may be applied to the other input terminal (−) of the subtraction circuit 67 to obtain the same function.

The matrix circuit 68 adds the high frequency luminance signal $Y_H$ to the low frequency luminance signal $Y_L$ to form a luminance signal Y ($= Y_H + Y_L$) having a frequency band of from 0 to 4.2 MHz, and subtracts the low frequency luminance signal $Y_L$ from the red and blue signals $R_L$ and $B_L$ to form color difference signal $R_L - Y_L$ and $B_L - Y_L$. The luminance signal Y and the color difference signals $R_L - Y_L$ and $B_L - Y_L$ are mixed by a color encoder circuit 69 to provide a video signal.

The frequency characteristics of the various signals produced in the above-described signal processing operation will be described in correspondence to those shown in FIG. 2A to 2F.

The signal $W_O$ applied to the subtraction circuit 67 by the monochrome image sensor 57 corresponds to the signal $G_O$ shown in FIG. 2A, the red, blue and green signal $R_L$, $B_L$ and $G_L$, outputted respectively by the low-pass filters 60, 62 and 64, correspond to those shown in FIG. 2B, the low frequency luminance signal $Y_L$ produced by the low frequency luminance signal forming circuit 65 corresponds to that in FIG. 2D; the high frequency luminance signal $Y_H$ corresponds to that shown in FIG. 2C, and the luminance signal Y and the color difference signals $R_L - Y_L$ and $B_L - Y_L$ correspond to the signal shown in FIG. 2E and those in FIG. 2F, respectively.

As described above, the high frequency luminance signal $Y_H$ is formed by subtraction of the low frequency signal $Y_L$ from the signal $W_O$, $Y_L$ being formed by the low pass filter 72 from the signal $W_O$ outputted by the monochrome image sensor 57. Therefore, the low frequency components of the signal $W_O$ are eliminated, and the occurrence of luminance distortion between the low frequency luminance signal $Y_L$ and the high frequency luminance signal $Y_H$ is prevented.

As described above, the color filter 54 is constructed such that stripe-shaped color filters are arranged at equal intervals. Therefore, the spatial frequency characteristics obtained for the red, blue and green hues are identical, and, for each of the hues, horizontal and vertical Nyquist frequency bands are made equal to one another.

Furthermore, since the unwanted high frequency components of the optical image are removed by the optical low-pass filter 53, the occurrence of color Moiré is suppressed. In addition, since the resolution is determined by the high frequency luminance signal $Y_H$ obtained through the monochrome image sensor 57, the resultant image is free from color Moiré; that is, it has a high resolution.

As described above, the video signal generating device of the invention comprises: the optical components which divide the optical image received through the image pickup optical system into first and second optical images; the monochrome image scanner having a first Nyquist spatial frequency band in the horizontal direction and which receives the first optical image; the color image sensor having a second Nyquist spatial frequency band in the horizontal direction lower than the first Nyquist spatial frequency band of the monochrome image sensor and having a color filter array on the surface thereof; the optical low-pass filter for limiting the second optical image to the spatial frequency band lower than the first Nyquist spatial frequency band; the matrix circuit for forming, according to the color signals outputted by the color image sensor, the luminance signal and the color difference signals whose frequency bands are lower than the first Nyquist spatial frequency band; the circuit for adding the low frequency luminance signal to the part of the high frequency luminance signal outputted by the monochrome image sensor, which is higher in frequency than the spatial frequency band of the low frequency luminance signal, to form the luminance signal; and the circuit for producing the video signal from the luminance signal and the color difference signals. With the arrangement of the invention, the resolution is determined according to the first Nyquist spatial frequency, as a result of which the overall resolution is greatly improved. Furthermore, the color signals produced by the color image sensor are made equal in spatial frequency characteristics, and signal components higher in frequency than the second Nyquist spatial frequency band are removed from the color signals, with the result that the occurrence of color Moiré is suppressed.

Thus, with the video signal generating device of the invention, images of high resolution essentially free from color Moiré are provided.

What is claimed is:

1. A device for generating a video signal, comprising:
   means for splitting an optical image from an image pickup system into first and second images;
   a monochrome image sensor which scans said first image in a horizontal direction and which has a first Nyquist spatial frequency band in said horizontal direction to produce a monochrome signal;
   a color image sensor having a color filter array on a surface thereof which scans said second image in a horizontal direction and which has a second Nyquist spatial frequency band in said horizontal direction which is lower than said first Nyquist spatial frequency band to produce color-separated signals;
   optical low-pass filter means for limiting said second image to a spatial frequency band lower than said first Nyquist spatial frequency band prior to scanning by said color image sensor;
   low frequency luminance signal forming means for forming a low frequency luminance signal in response to said color-separated signals;
   high frequency luminance signal forming means for forming a high frequency luminance signal in response to said monochrome signal;
   a matrix circuit for forming a luminance signal in response to said low frequency and high frequency luminance signals and for forming color difference signals in response to said low frequency luminance signal and selected ones of said color-separated signals; and
   means for generating said video signal in response to said luminance signal and said color difference signals formed by said matrix circuit.

2. The device as claimed in claim 1, wherein said color filter array comprises stripe-shaped red, green and blue filters.

3. The device as claimed in claim 2, wherein said red, green and blue filters are arranged at equal intervals.

4. The device as claimed in claim 1, wherein said high frequency luminance signal forming means comprises a low-pass filter for extracting a low frequency component of said monochrome signal; and
   a subtraction circuit for subtracting said low frequency component from said monochrome signal to form said high frequency luminance signal.

5. The device as claimed in claim 1, further comprising sample-and-hold circuits coupled to said color image sensor for sampling-and-holding said color-separated signals in synchronism with the scanning of said color image sensor.

6. The device as claimed in claim 1, wherein said means for splitting comprises a half-silvered mirror.

* * * * *